(12) United States Patent
Sakamoto et al.

(10) Patent No.: US 12,308,391 B2
(45) Date of Patent: May 20, 2025

(54) SEGMENTED CELL ARCHITECTURE FOR SOLID STATE BATTERIES

(71) Applicants: Jeffrey Sakamoto, Ann Arbor, MI (US); Travis Thompson, Ann Arbor, MI (US)

(72) Inventors: Jeffrey Sakamoto, Ann Arbor, MI (US); Travis Thompson, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 15/421,499

(22) Filed: Feb. 1, 2017

(65) Prior Publication Data

US 2017/0222254 A1  Aug. 3, 2017

Related U.S. Application Data

(60) Provisional application No. 62/289,559, filed on Feb. 1, 2016.

(51) Int. Cl.
*H01M 10/058* (2010.01)
*H01M 4/04* (2006.01)
(Continued)

(52) U.S. Cl.
CPC ....... *H01M 10/058* (2013.01); *H01M 4/0471* (2013.01); *H01M 4/0485* (2013.01); *H01M 4/131* (2013.01); *H01M 4/133* (2013.01); *H01M 4/134* (2013.01); *H01M 4/136* (2013.01); *H01M 4/1391* (2013.01); *H01M 4/1393* (2013.01); *H01M 4/1395* (2013.01); *H01M 4/1397* (2013.01); *H01M 4/485* (2013.01); *H01M 4/5825* (2013.01); *H01M 10/052* (2013.01); *H01M 10/0525* (2013.01);
(Continued)

(58) Field of Classification Search
None
See application file for complete search history.

(56) References Cited

U.S. PATENT DOCUMENTS

| 1,332,483 | A | 3/1920 | Bridge |
| 3,033,909 | A | 5/1962 | Urry |

(Continued)

FOREIGN PATENT DOCUMENTS

| JP | 2008-103260 A | 5/2008 |
| JP | 2012160371 A | 8/2012 |

(Continued)

OTHER PUBLICATIONS

MacMillan Dictionary definition of "pillar", accessed Feb. 10, 2021 (Year: 2021).*

(Continued)

*Primary Examiner* — Alix E Eggerding
(74) *Attorney, Agent, or Firm* — Quarles & Brady LLP

(57) ABSTRACT

Disclosed are electrochemical devices, such as lithium ion battery electrodes, lithium ion conducting solid-state electrolytes, and solid-state lithium ion batteries including these electrodes and solid-state electrolytes. Also disclosed are methods for making such electrochemical devices. In particular, a segmented cell architecture disclosed herein enables solid state batteries to be flexible and capable of assuming a rolled or folded stack structure.

22 Claims, 11 Drawing Sheets

(51) Int. Cl.
*H01M 4/131* (2010.01)
*H01M 4/133* (2010.01)
*H01M 4/134* (2010.01)
*H01M 4/136* (2010.01)
*H01M 4/1391* (2010.01)
*H01M 4/1393* (2010.01)
*H01M 4/1395* (2010.01)
*H01M 4/1397* (2010.01)
*H01M 4/485* (2010.01)
*H01M 4/58* (2010.01)
*H01M 10/052* (2010.01)
*H01M 10/0525* (2010.01)
*H01M 10/0562* (2010.01)
*H01M 10/0565* (2010.01)

(52) U.S. Cl.
CPC ... *H01M 10/0562* (2013.01); *H01M 10/0565* (2013.01); *H01M 2300/0071* (2013.01); *H01M 2300/0077* (2013.01); *H01M 2300/0082* (2013.01)

(56) References Cited

U.S. PATENT DOCUMENTS

| | | | |
|---|---|---|---|
| 3,129,118 A | 4/1964 | Wilke et al. | |
| 3,428,495 A | 2/1969 | Deschamps | |
| 4,022,952 A | 5/1977 | Fritts | |
| 4,192,913 A | 3/1980 | Koontz et al. | |
| 4,400,447 A | 8/1983 | Gerenser et al. | |
| 4,551,399 A | 11/1985 | Despic | |
| 4,822,698 A | 4/1989 | Jackovitz et al. | |
| 5,395,709 A | 3/1995 | Bowker et al. | |
| 6,529,308 B2 | 3/2003 | Beteille et al. | |
| 7,282,295 B2 | 10/2007 | Visco et al. | |
| 7,288,340 B2* | 10/2007 | Iwamoto | H01M 4/131 429/128 |
| 7,396,612 B2 | 7/2008 | Ohata et al. | |
| 7,754,377 B2 | 7/2010 | Ohata et al. | |
| 7,758,998 B2 | 7/2010 | Ohata et al. | |
| 7,829,212 B2 | 11/2010 | Visco et al. | |
| 7,931,983 B2 | 4/2011 | Ohata et al. | |
| 8,048,571 B2 | 11/2011 | Visco et al. | |
| 8,114,171 B2 | 2/2012 | Visco et al. | |
| 8,124,267 B2* | 2/2012 | Kang | H01M 10/052 429/122 |
| 8,202,649 B2 | 6/2012 | Visco et al. | |
| 8,293,398 B2 | 10/2012 | Visco et al. | |
| 8,486,568 B2 | 7/2013 | Sanada et al. | |
| 8,501,339 B2 | 8/2013 | Visco et al. | |
| 8,691,429 B2 | 4/2014 | Kim et al. | |
| 8,883,357 B2 | 11/2014 | Yoshida et al. | |
| 8,889,300 B2 | 11/2014 | Bugga et al. | |
| 8,900,743 B2 | 12/2014 | Kim et al. | |
| 8,932,771 B2 | 1/2015 | Visco et al. | |
| 9,034,421 B2 | 5/2015 | Mikhaylik et al. | |
| 9,077,041 B2 | 7/2015 | Burnside et al. | |
| 9,093,717 B2 | 7/2015 | Sakamoto et al. | |
| 9,166,214 B2 | 10/2015 | Stringer et al. | |
| 9,172,114 B2 | 10/2015 | Chao et al. | |
| 9,246,158 B2 | 1/2016 | Holme et al. | |
| 9,276,255 B2 | 3/2016 | Glanz et al. | |
| 9,531,036 B2 | 12/2016 | Ohta et al. | |
| 2003/0013012 A1* | 1/2003 | Ahn | H01G 9/26 429/152 |
| 2003/0099884 A1 | 5/2003 | Chiang et al. | |
| 2004/0106037 A1 | 6/2004 | Cho et al. | |
| 2005/0214621 A1* | 9/2005 | Liu | H05K 1/16 429/492 |
| 2009/0197183 A1 | 8/2009 | Kato | |
| 2010/0099020 A1 | 4/2010 | Ouwerkerk et al. | |
| 2011/0183183 A1 | 7/2011 | Grady et al. | |
| 2011/0281173 A1 | 11/2011 | Singh et al. | |
| 2012/0141881 A1* | 6/2012 | Geier | H01M 4/505 429/311 |
| 2014/0072697 A1 | 3/2014 | Hiramatsu | |
| 2014/0099538 A1 | 4/2014 | Johnson et al. | |
| 2014/0186720 A1 | 7/2014 | Kintaka | |
| 2014/0234726 A1 | 8/2014 | Christensen et al. | |
| 2014/0377665 A1 | 12/2014 | Yoshida et al. | |
| 2015/0024256 A1* | 1/2015 | Anandan | H01M 6/187 429/162 |
| 2015/0099188 A1* | 4/2015 | Holme | H01M 10/0525 429/231.95 |
| 2016/0099453 A1 | 4/2016 | Anandan et al. | |
| 2016/0190640 A1* | 6/2016 | Visco | H01M 10/0525 429/322 |
| 2017/0047589 A1* | 2/2017 | Noi | C01G 25/00 |

FOREIGN PATENT DOCUMENTS

| | | |
|---|---|---|
| JP | 2012169071 A | 9/2012 |
| JP | 2013058427 A | 3/2013 |
| JP | 2014-056747 | 3/2014 |
| JP | 2014060014 A | 4/2014 |
| JP | 2014179250 A | 9/2014 |
| WO | 2014124049 A2 | 8/2014 |

OTHER PUBLICATIONS

Merriam-Webster Dictionary definition of "pillar", accessed Feb. 10, 2021 (Year: 2021).*
Oxford English Dictionary definition of "pillar", accessed Feb. 10, 2021 (Year: 2021).*
Gambe, et al., Development of Bipolar All-solid-state Lithium Battery Based on Quasi-solid-state Electrolyte Containing Tetraglyme-LiTFSA Equimolar Complex, Scientific Reports, 2015, 5:8869, 11 pages.
Hu, et al., Lithium-Ion Textile Batteries with Large Areal Mass Loading, Advanced Energy Materials, 2011, 1(6):1012-1017.
Singh, Paintable Battery, Scientific Reports, 2012, 2:481, 5 pages.
Xu, et al., Stretchable Batteries with Self-Similar Serpentine Interconnects and Integrated Wireless Recharging Systems, Nature Communications, 2013, 4:1543, 28 pages.
PCT International Search Report and Written Opinion, PCT/US2017/015773, Apr. 20, 2017.
Gwon et al., Recent Progress on Flexible Lithium Rechargeable Batteries, Energy & Environmental Science, 2014, 7(2):538-551.
Kim et al., Printable Solid-State Lithium-Ion Batteries: A New Route Toward Shape-Conformable Power Sources with Aesthetic Versatility for Flexible Electronics, Nano Letters, 2015, 15(8):5168-5177.
Pushparaj et al., Flexible Energy Storage Devices Based on Nanocomposite Paper, Proceedings of the National Academy of Sciences, 2007, 104(34):13574-13577.
Vlad et al., Roll Up Nanowire Battery From Silicon Chips, Proceedings of the National Academy of Sciences, 2012, 109(38):15168-15173.
Machine Translation of JP 2014-056747.
Machine Translation of JP 2008-103260 A.

* cited by examiner

Stacking Tile Sheet Assemblies

Low Aspect Ratio Stack Element

SEGMENTED CELL ARCHITECTURE FOR SOLID STATE BATTERIES

CROSS-REFERENCES TO RELATED APPLICATIONS

This application claims priority to U.S. Patent Application No. 62/289,559 filed Feb. 1, 2016.

STATEMENT REGARDING FEDERALLY SPONSORED RESEARCH

Not Applicable.

BACKGROUND OF THE INVENTION

1. Field of the Invention

This invention relates to electrochemical devices, such as lithium ion battery electrodes, lithium ion conducting solid-state electrolytes, and solid-state lithium ion batteries including these electrodes and solid-state electrolytes. This invention also relates to methods for making such electrochemical devices. More particularly, the invention relates to a segmented cell architecture that enables solid state batteries to be flexible and capable of assuming a rolled or folded stack structure.

2. Description of the Related Art

Lithium lion (Li-ion) battery technology has advanced significantly and has a market size projected to be $10.5 billion by 2019. Current state-of-the-art Li-ion batteries comprise two electrodes (an anode and a cathode), a separator material that keeps the electrodes from touching but allows $Li^+$ ions through, and an electrolyte (which is an organic liquid with lithium salts). During charge and discharge, $Li^+$ ions are exchanged between the electrodes.

State-of-the-art Li-ion technology is currently used in low volume production plug-in hybrid and niche high performance vehicles; however, widespread adoption of electrified powertrains requires 25% lower cost, four times higher performance, and safer batteries without the possibility of fire. Thus, future energy storage demands safer, cheaper and higher performance means of energy storage.

One strategy is to develop solid state batteries, where the liquid electrolyte is replaced with a solid material that is conductive to $Li^+$ ions and can offer three to four times the energy density while reducing the battery pack cost by about 20%. Despite these attractive features, the fabrication and testing of solid state batteries for bulk scale applications, such as electric vehicles, has not been demonstrated. The primary challenge associated with solid state batteries is the development of new manufacturing techniques for thin ceramic layers and the assembly of these layers into new cell architectures.

Regardless of how each layer of the solid state battery may be formed, these layers must be assembled into an architecture. Current liquid-based technology layers each piece of a battery—the anode, separator, and cathode—into a stack, and then this stack is rolled or folded. This type of rolled or folded stack architecture requires each layer to be flexible and capable of being significantly bent. Since the layers for a typical solid state battery are not as flexible as the current liquid-based technology layers, rolled or folded architectures have not been possible.

Therefore, what is needed are new cell architectures and methods for their fabrication that will enable solid state batteries to be flexible and capable of assuming a rolled or folded stack structure.

SUMMARY OF THE INVENTION

This disclosure reports on a segmented cell architecture that enables solid state batteries to be flexible and capable of assuming a rolled or folded stack structure. The present disclosure also provides methods for forming a segmented cell architecture for solid state batteries.

In one aspect, the invention provides an electrochemical device comprising a cathode, an anode, and a solid-state electrolyte positioned between the cathode and the anode. Either of or both the cathode and the anode may comprise an array of segments embedded within a structural matrix. The segments of the cathode or the anode may comprise a lithium host material. The structural matrix may comprise a flexible material. The structural matrix may comprise a polymeric material. The polymeric material may be selected from the group consisting of polyolefins, polystyrene, divinylbenzene, and styrene-divinylbenzene copolymer. The structural matrix may comprise polypropylene or polyethylene. In the electrochemical device, the anode may comprise the array of segments embedded within the structural matrix, and the lithium host material may be selected from the group consisting of graphite, lithium metal, lithium titanium oxides, hard carbon, tin/cobalt alloy, or silicon/carbon. In the electrochemical device, the cathode may comprise the array of segments embedded within the structural matrix, and the lithium host material may be selected from the group consisting of lithium metal oxides wherein the metal is one or more aluminum, cobalt, iron, manganese, nickel and vanadium, and lithium containing phosphates having a general formula $LiMPO_4$ wherein M is one or more of cobalt, iron, manganese, and nickel. The lithium host material may be selected from lithium manganese nickel oxides. The lithium host material may be selected from lithium titanium oxides.

In another aspect, the invention provides an electrochemical device comprising a cathode, an anode, and a solid-state electrolyte positioned between the cathode and the anode, wherein the solid-state electrolyte comprises an array of segments. The segments of the solid-state electrolyte may comprise a solid electrolyte material and may be embedded within a structural matrix. The structural matrix may comprise a flexible material. The structural matrix may comprise a polymeric material. The polymeric material may be selected from the group consisting of polyolefins, polystyrene, divinylbenzene, and styrene-divinylbenzene copolymer. The structural matrix may comprise polypropylene or polyethylene. In the electrochemical device, the solid electrolyte material can be any combination oxide or phosphate materials with the garnet, perovskite, NaSICON, or LiSICON phase. The garnet phase can have the formula $Li_u Re_v M_w A_x O_y$, wherein Re can be any combination of elements with a nominal valance of +3 including La, Nd, Pr, Pm, Sm, Sc, Eu, Gd, Tb, Dy, Y, Ho, Er, Tm, Yb, and Lu; M can be any combination of metals with a nominal valance of +3, +4, +5 or +6 including Zr, Ta, Nb, Sb, W, Hf, Sn, Ti, V, Bi, Ge, and Si; A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn; u can vary from 3-7.5; v can vary from 0-3; w can vary from 0-2; and y can vary from 11-12.5. The garnet can, be lithium lanthanum zirconium oxide having the formula $Li_{6.25}La_3Zr_2Al_{0.25}O_{12}$ (LLZO) which is a ceramic oxide that exhibits the combination of high ionic conductivity ($4\times10^{-4}$ S/cm at room temperature) and chemical stability against metallic lithium.

In another aspect, the invention provides a method for forming a segmented electrode. The method may comprise the steps of: (a) forming an array comprising spaced apart segments; and (b) depositing a flexible material between the segments, wherein the segments comprise a lithium host material, Step (a) may comprise casting a slurry on a surface to form the array comprising spaced apart segments, and sintering the segments. Each segment may have a thickness in a range of 10 to 100 microns. Step (a) may comprise sintering the layer at a temperature in a range of 600° C. to 1100° C. In the method, the lithium host material may be selected from the group consisting of graphite, lithium metal, lithium titanium oxides, hard carbon, tin/cobalt alloy, or silicon/carbon. The lithium host material may be selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel. The lithium host material may be selected from lithium manganese nickel oxides. The lithium host material may be selected from lithium titanium oxides.

In another aspect, the invention provides a method for forming a segmented solid-state electrolyte array. The method may include the steps of: (a) forming an array comprising spaced apart segments; and (b) depositing a flexible material between the segments, wherein the segments comprise a solid electrolyte material. Step (a) may comprise casting a slurry on a surface to form the array comprising spaced apart segments and sintering the segments to form the solid-state electrolyte material, wherein the slurry comprises a solid electrolyte material precursor. In the method, each segment may have a thickness in a range of 10 to 100 microns. The slurry may comprise 40 wt. % to 60 wt. % of the solid electrolyte material wherein the solid electrolyte material comprises lithium lanthanum zirconium oxide having the formula $Li_{6.25}La_3Zr_2Al_{0.25}O_{12}$, 0.1 wt. % to 2 wt. % of a dispersant, 1 wt. % to 5 wt. % of a binder, 1 wt. % to 5 wt. % of a plasticizer, and 20 wt. % to 45 wt. % of a solvent, wherein all weight percentages are percent by weight of the total slurry. Step (a) may comprise sintering the layer at a temperature in a range of 600° C. to 1100° C.

In another aspect, the invention provides a method for forming an electrochemical device. The method may include the steps of: (a) forming a first layer of an array comprising spaced apart segments, wherein the segments comprise a first lithium host material; (b) forming a second layer of the array on the first layer of the array, wherein the second layer comprises a solid electrolyte material; (c) forming a third layer of the array on the second layer of the array, wherein the third layer comprises a second lithium host material; and (d) depositing a flexible material between the segments to form the electrochemical device. In the method, step (a) may comprise casting a first slurry on a surface to form the first layer of the array comprising spaced apart segments, wherein the first slurry comprises the first lithium host material; step (b) may comprise casting a second slurry on the first layer of the array to form the second layer of the array, wherein the second slurry comprises the solid electrolyte material; step (c) may comprise casting a third slurry on the second layer of the array to form the third layer of the array, wherein the third slurry comprises the second lithium host material; and step (d) may comprise sintering the array before depositing the flexible material between the segments. In the method, each of the first, second, and third layers may have a thickness in a range of 10 to 100 microns. In the method, the surface may comprise a surface of a flexible current collector. The flexible material deposited between the segments may comprise a polymeric material. The polymeric material may be selected from polyolefins, polystyrenes, divinylbenzene, and styrene-divinylbenzene copolymer. The polymeric material may be selected from polypropylene and polyethylene. In the method, the first lithium host material may be selected from (i) a first group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel, and (ii) a second group consisting of graphite, lithium metal, lithium titanium oxides, hard carbon, tin/cobalt alloy, or silicon/carbon. The second lithium host material is selected from the second group when the first lithium host material is selected from the first group, and the second lithium host material is selected from the first group when the first lithium host material is selected from the second group. Step (d) may comprise sintering the array at a temperature in a range of 600° C. to 1100° C. In the method, step (a) may comprise first casting a layer of polymeric material and forming, indentations in the layer, wherein the indentations provide spaces within the array for the spaced apart segments. The method may further comprise stacking the electrochemical device atop a similar electrochemical device thereby forming a bipolar stacked battery. In the method, the second slurry may comprise 40 wt. % to 60 wt. % of the solid electrolyte material wherein the solid electrolyte material comprises lithium lanthanum zirconium oxide having the formula $Li_{6.25}La_3Zr_2Al_{0.25}O_{12}$, 0.1 wt. % to 2 wt. % of a dispersant, 1 wt. % to 5 wt. % of a binder, 1 wt. % to 5 wt. % of a plasticizer, and 20 wt. % to 45 wt. % of a solvent, wherein all weight percentages are percent by weight of the total slurry. In the method, the solid electrolyte material may be selected from the group consisting of oxide materials with the garnet phase. The solid electrolyte material may be a lithium lanthanum zirconium oxide. The solid electrolyte material may have the formula $Li_{6.25}La_3Zr_2Al_{0.25}O_{12}$. The solid electrolyte material may have the formula $Li_uRe_vM_wA_xO_y$, wherein: Re can be any combination of elements with a nominal valance of +3 including La, Nd, Pr, Pm, Sm, Sc, Eu, Gd, Tb, Dy, Y, Ho, Er, Tm, Yb, and Lu; M can be any combination of metals with a nominal valance of +3, +4, +5 or +6 including Zr, Ta, Nb, Sb, W, Hf, Sn, Ti, V, Bi, Ge, and Si; A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn; u can vary from 3-7.5; v can vary from 0-3; w can vary from 0-2; and y can vary from 11-12.5.

In another aspect, the invention provides a method for forming a segmented electrochemical device. The method may include the steps of: (a) forming a first layer comprising a first lithium host material; (b) forming a second layer on the first layer, wherein the second layer comprises a solid electrolyte material; (c) forming a third layer on the second layer to form a continuous stack, wherein the third layer comprises a second lithium host material; (d) dividing the continuous stack into segments, wherein each of the segments comprises a part of the first, second, and third layers of the continuous stack; (e) dispersing the segments into an array; and (f) depositing a flexible material between the segments to form the segmented electrochemical device. In the method, step (a) may comprise casting a first slurry on a surface to form the first layer, wherein the first slurry comprises the first lithium host material; step (b) may comprise casting a second slurry on the first layer to form the second layer, wherein the second slurry comprises the solid electrolyte material; step (c) may comprise casting a third slurry on the second layer to form the third layer and sintering the first, second, and third layers to form the continuous stack, wherein the third slurry comprises the second lithium host material. The method may further comprise stacking the electrochemical device atop a similar electrochemical device thereby forming a bipolar stacked battery. In the method, each of the first, second, and third layers may have a thickness in a range of 10 to 100 microns. The surface may comprise a surface of a flexible current collector. The flexible material deposited between the segments may comprise a polymeric material. The polymeric material may be selected from polyolefins, polystyrenes, divinylbenzene, and styrene-divinylbenzene copolymer. The polymeric material may be selected from polypropylene and polyethylene. In the method, the first lithium host material may be selected from (i) a first group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel, and (ii) a second group consisting of graphite, lithium metal, lithium titanium oxides, hard carbon, tin/cobalt alloy, or silicon/carbon. The second lithium host material is selected from the second group when the first lithium host material is selected from the first group, and the second lithium host material is selected from the first group when the first lithium host material is selected from the second group. Step (d) may comprise sintering the first, second, and third layers at a temperature in a range of 600° C. to 1100° C. The second slurry may comprise 40 wt. % to 60 wt. % of the solid electrolyte material wherein the solid electrolyte material comprises lithium lanthanum zirconium oxide having the formula $Li_{6.25}La_3Zr_2Al_{0.25}O_{12}$, 0.1 wt. % to 2 wt. % of a dispersant, 1 wt. % to 5 wt. % of a binder, wt % to 5 wt. % of a plasticizer, and 20 wt. % to 45 wt. % of a solvent, wherein all weight percentages are percent by weight of the total slurry. The solid electrolyte material may be selected from the group consisting of oxide materials with the garnet phase. The solid electrolyte material may be a lithium lanthanum zirconium oxide. The solid electrolyte material may have the formula $Li_{6.25}La_3Zr_2Al_{0.25}O_{12}$. The solid electrolyte material may have the formula $Li_u Re_v M_w A_x O_y$, wherein: Re can be any combination of elements with a nominal valance of +3 including La, Nd, Pr, Pm, Sm, Sc, Eu, Gd, Tb, Dy, Y, Ho, Er, Tm, Yb, and Lu; M can be any combination of metals with a nominal valance of +3, +4, +5 or +6 including Zr, Ta, Nb, Sb, W, Hf, Sn, Ti, Bi, Ge, and Si; A can be any combination of dopant atoms with nominal valance of +1, +2, +3 or +4 including N, Na, K, Rb, Cs, Ba, Sr, Ca, Mg, Fe, Co, Ni, Cu, Zn, Ga, Al, B, and Mn; u can vary from 3-7.5; v can vary from 0-3; w can vary from 0-2; and y can vary from 11-12.5.

A solid state battery fabricated using the methods and cell architecture of the invention has many advantages. For example, a solid state battery fabricated using the methods and cell architecture of the invention is safer than a liquid electrolyte battery (i.e., it is non-flammable); a solid state battery fabricated using the methods and cell architecture of the invention offers higher energy density; a solid state battery fabricated using the methods and cell architecture of the invention reduces battery cost (e.g., simpler packaging is used); and a solid state battery fabricated using the methods and cell architecture of the invention allows ceramics to be used in various structures. Further, solid state batteries fabricated using the methods and cell architecture of the invention will enable the batteries to be flexible and capable of assuming a rolled or folded stack structure.

These and other features, aspects, and advantages of the present invention will become better understood upon consideration of the following detailed description, drawings, and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

Figure 1:
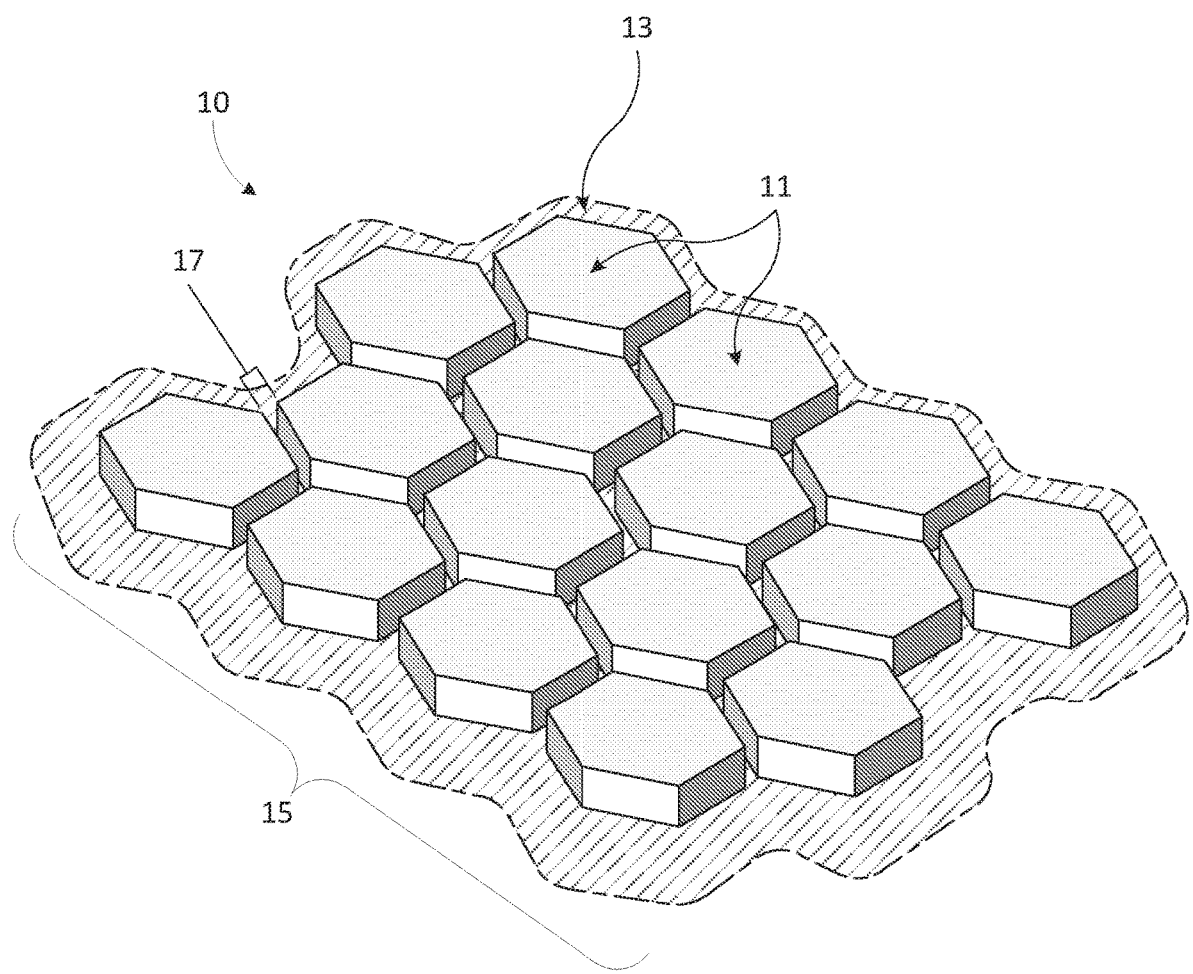
FIG. 1 is a partial perspective view of an exemplary embodiment of an electrode including an array of spaced apart segments.

The present invention provides new cell architectures and methods for their fabrication suitable for use in solid state batteries that will enable the batteries to be flexible and capable of assuming a rolled or folded stack structure.

Active material, as used throughout this specification, means the material in a battery layer which is participating in the electrochemical reaction. This may include a material transporting or storing Li atoms but exclude materials such as additives to increase the electronic conductivity. Formation, as used throughout this specification, means the process or state where all the materials in the cell become active and the device may behave as a battery. For example, formation may be bonding all three layers (anode, electrolyte, and cathode) together so that the electrochemical reaction can occur.

Presently, liquid based batteries are fabricated in two steps. First, layers of each electrode type are cast from a slurry onto a metal foil, or current collector. The cast slurries on the metal current collectors can be several meters long, and the process is amenable to continuous roll-to-roll processing. The dried electrodes from the slurries are composites which contain flexible polymer binders in addition to the active materials. A stack is then formed comprised of three components: the anode, separator, and cathode. This stack can be rolled, or folded, and placed inside a container. Once in the container, the liquid electrolyte is added and the battery is formed. The combination of discrete layers in a rolled or folded geometry is called the cell architecture.

The cell architecture described above is advantageous from a manufacturing stand point since the process is amenable to roll-to-roll continuous processing and is therefore inexpensive. As such, new battery technologies, including solid state batteries, must be amenable to continuous processing to some extent in order to be cost competitive with the incumbent technology. This continuous processing of solid state batteries may include casting each of the three layers—anode, electrolyte, and cathode—from a slurry. However, unlike liquid electrolyte batteries, a high temperature sintering step is required to form the solid state battery. At such high temperatures, any polymer, which may provide flexibility to the film, may be lost. As such, the resulting films have limited flexibility and cannot be rolled as a continuous sheet. Furthermore, since materials for solid state batteries are ceramic and inherently brittle, the high aspect ratio of such a large area to a small thickness within a continuous sheet may result in fracture. To overcome these disadvantages, the new cell architectures disclosed herein may minimize the fracture of the layers and may enable an inherently brittle material to be used in a roll-to-roll continuous process.

As mentioned above, a cell architecture is a culmination of how the battery pieces—anode, electrolyte, and cathode—are assembled into a package. For example, the rolling or folding of discrete composite layers of a battery constitute different package assemblies. Several different techniques, such as film deposition, may be utilized in order to form the disclosed cell architectures.

As seen in the electrode 10 of FIG. 1, instead of forming a continuous sheet on a current collector 13, the layer material may be broken up into regularly repeating sub-units, similar to tiles or segments 11, The repeating pattern of segments 11 may form an array 15. These segments 11 may offer advantages such as reducing the aspect ratio—each segment 11 has a small area compared to its thickness—so that fracture is less likely. Another benefit of the segments 11 is the flexibility they may allow for in the resulting structures, such as segments 11 dispersed on a flexible current collector 13. The flexible structures or arrays 15 may be used in roll-to-roll processing.

Figure 2:
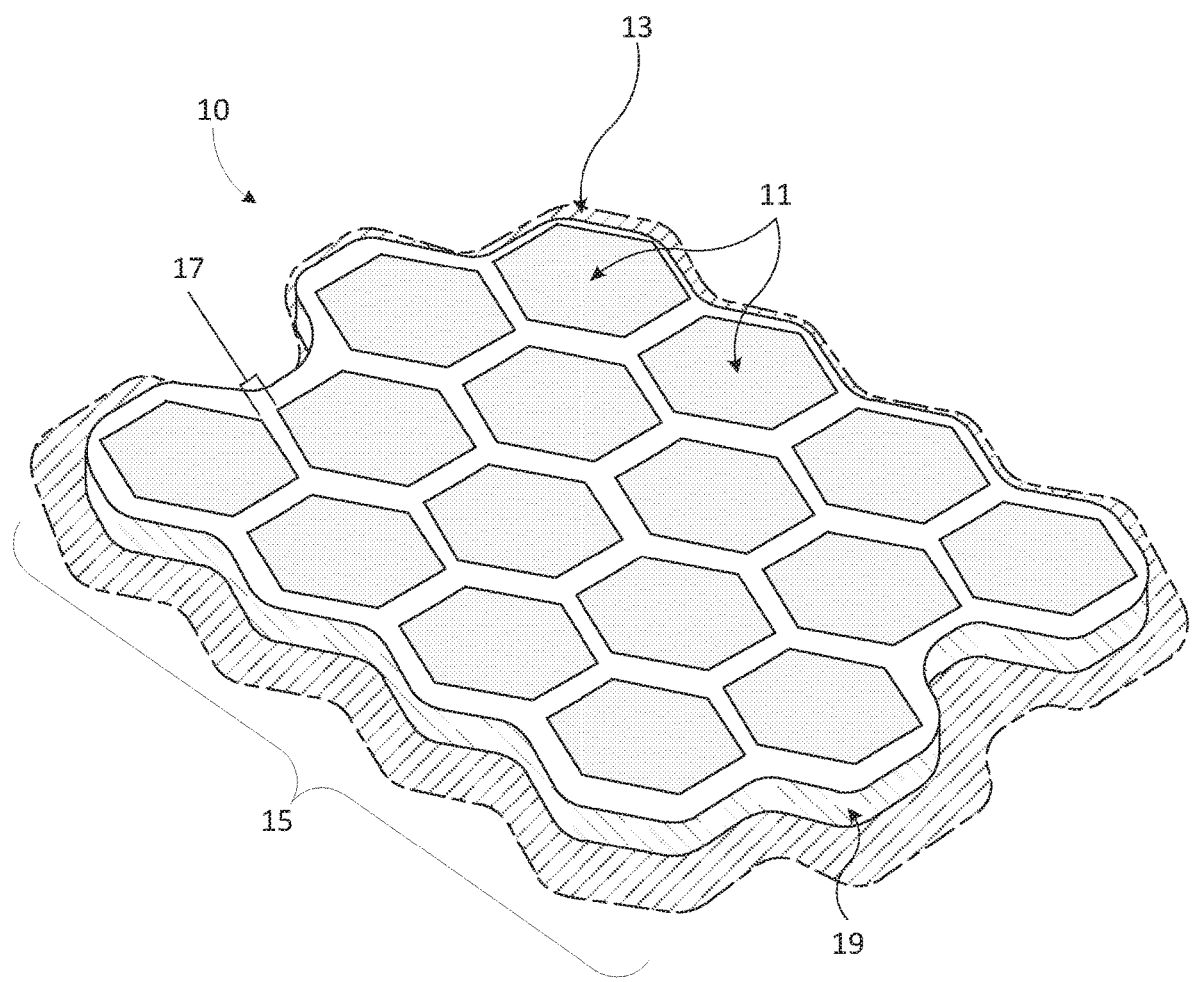
FIG. 2 is another perspective view of the exemplary embodiment of an electrode including the array of spaced apart segments embedded in a structural matrix.

Extending the tile analogy, the spaces 17 between the tiles, or segments 11, may be back filled with a second material (such as a polymer or other flexible material). As seen in FIG. 2, this second material filling in the spaces 17 between the segments 11 forms a structural matrix 19. The structural matrix 19 may provide structural support for the segments 11. The structural matrix material may or may not be electrochemically active.

The segments 11 embedded in the structural matrix 19 may form a "tiled" structure with polymeric "grout" which may be a composite. However, this novel cell architecture offers distinct advantages for solid state batteries. Each layer—the anode, electrolyte, and cathode—may be formed in the manner described above. These layers may then be repeatedly stacked and bonded together into a monolithic battery.

The segments 11 may be of any size. For example, the segments 11 may be as small as 1-5 micrometers or as large 1-5 centimeters across. Furthermore, the segments 11 may have a thickness of 1-5 micrometers up to a thickness of 100 micrometers.

Figure 5:
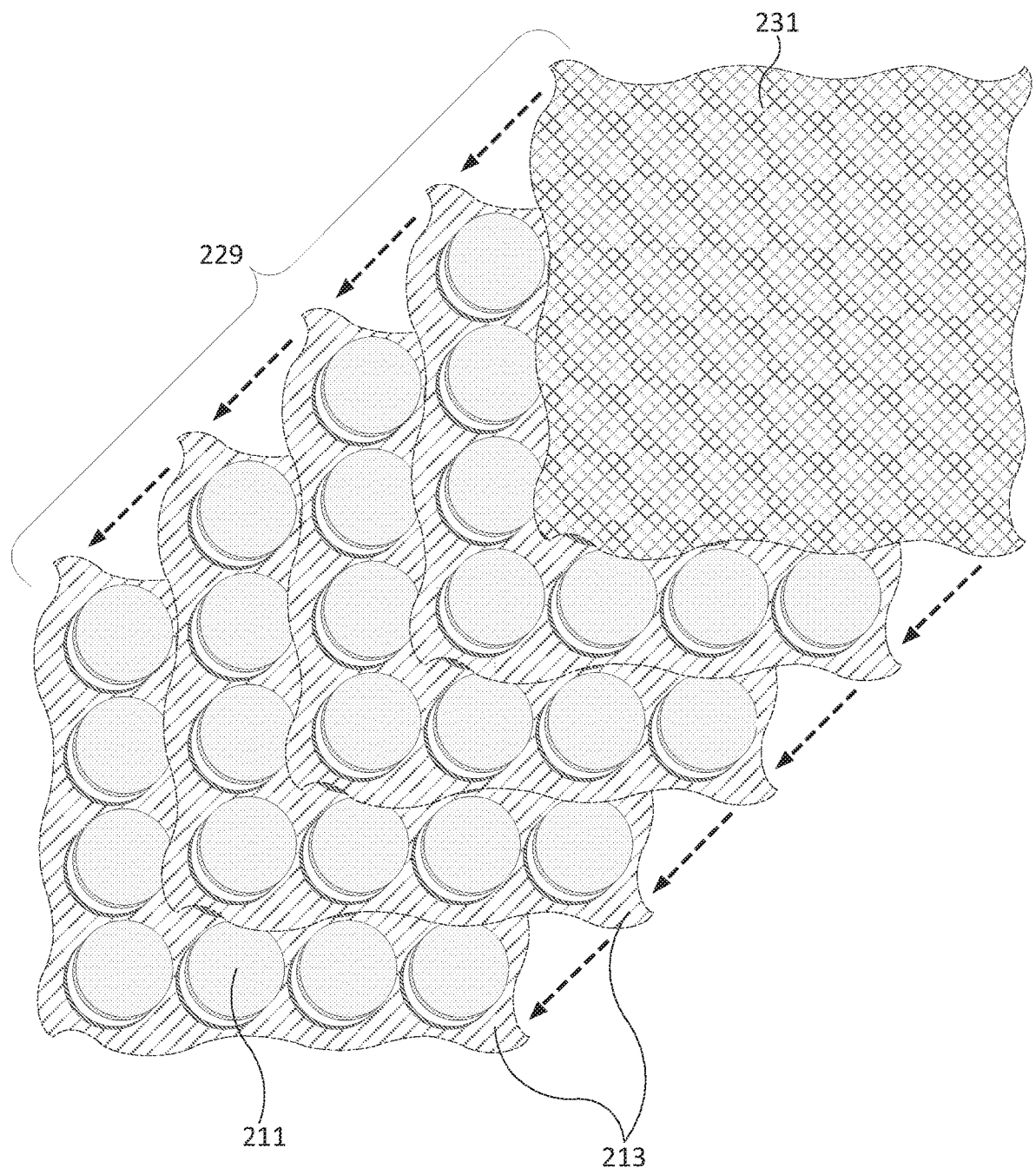
FIG. 5 is a partial exploded view of another exemplary embodiment of a bipolar stacked battery similar to the embodiment of FIG. 4.
Figure 6:
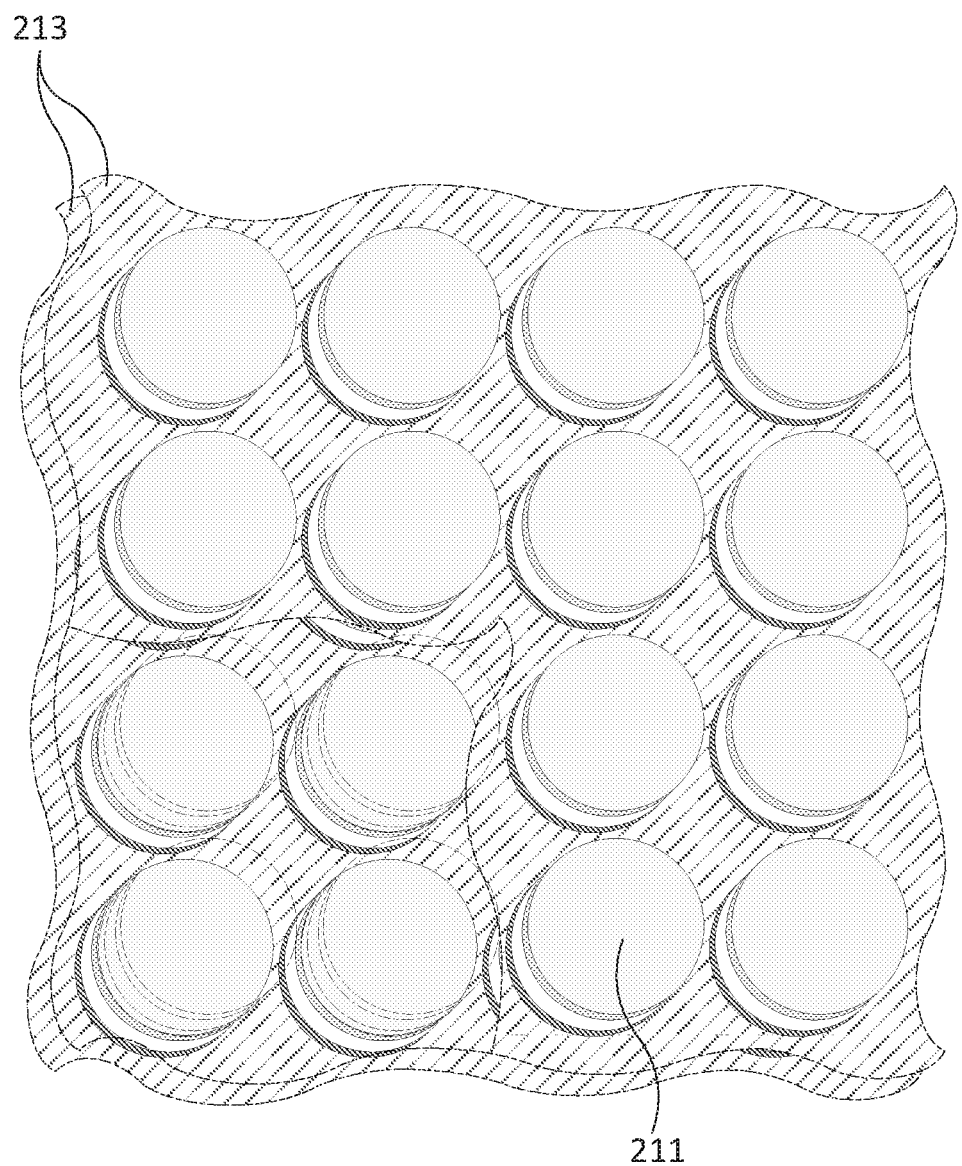
FIG. 6 is a partial cutaway view of an exemplary embodiment of stacked electrodes similar those in the embodiment of FIG. 4.

The segments 11 may be of any shape. For example, as shown in FIGS. 1-2, the segments 11 may be formed in the shape of polyhedrons, or other self-similar shapes, which may be closely packed. These close-packed structures may advantageously minimize the space 17 between each segment 11, thus saving on the space that the entire array 15 would otherwise occupy. For example, the segments 11 may be shaped as hexagons, squares, triangles, discs (as seen in FIGS. 5-6), or any combination thereof. Alternatively, the segments 11 may be randomly formed or fractured into various shapes which may lower processing costs. For example, a three-layer continuous sheet of an anode, solid-state electrolyte, and cathode may be cast, sintered, and then fractured to form the array 15. The randomly occurring fractures, or spaces 17, along the three-layer continuous sheet may be filled with a flexible material, for example by spraying or pouring the flexible material in a liquid state over the sheet and allowing it to set to form the structural matrix 19.

The segments 11 may be spaced any distance away from each other. For example, the segments 11 may be spaced anywhere from 100-900 nanometers, 1-9 micrometers, or 10-50 micrometers away from each other.

The segments 11 may be of any composition. The composition of a segment 11 may be different in the as-deposited state as compared to the as-formed state. For example, the composition in the as-deposited state may contain additives, besides the active material, to enhance deposition. Similarly, the composition in the as-deposited state may contain additives to enhance the battery performance after formation.

The structural matrix 19 may be of any composition. The structural matrix 19 may be advantageously formed of a flexible polymer-based material which may enhance the mechanical properties of the sheet. However, the structural matrix 19 may be formed of any material, such as thermoplastic polymers, inorganic polymers, metals, glass, or ceramics. Non-limiting example polymeric materials include polyolefins (e.g., polypropylene or polyethylene), polystyrene, divinylbenzene, and styrene-divinylbenzene copolymer.

Figure 3:
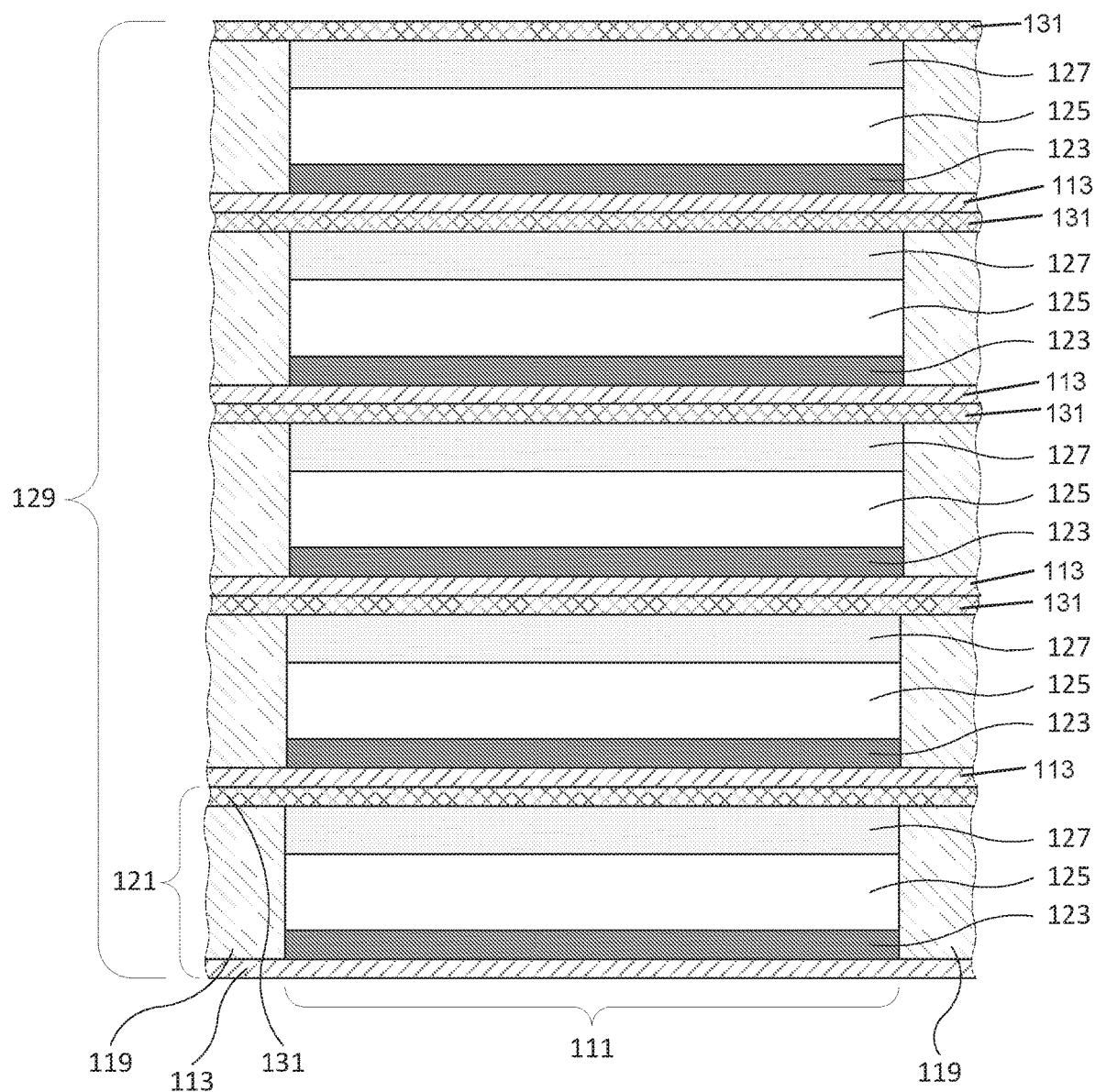
FIG. 3 is a partial side view of an exemplary embodiment of a bipolar stacked battery including bilaminar current collectors and segments embedded in structural matrices.

As seen in FIG. 3, segments 111 may be formed from layers of cathode 123, solid electrolyte 125, and anode 127. The layers may be sintered together in continuous sheets and divided into the segments 111, and then dispersed into an array (not shown) over a first current collector 113, The spaces between the segments 111 may be filled with a structural matrix 119. The structural matrix 119 may be made of a polymer or other flexible material. Alternatively, the structural matrix 119 may be of any other material, A second current collector 131 may be applied over the top of the array of tri-layered segments 111 in a structural matrix. The first and second current collectors 113,131 may be made of flexible material or thin foils with some flexibility. For example, the first current collector 113 may comprise a conductive aluminum foil, and the second current collector 131 may be conductive fabric with metallic threading or a mesh.

The layers of a first current collector 113, cathode 123, solid electrolyte 125, anode 127, and second current collector 131 may form a unit cell 121. Multiple layers of unit cells 121 may be rolled or stacked or otherwise arranged to form a battery. As shown in FIG. 3, the unit cells 121 may be stacked in series to form a bipolar stacked battery 129 with bilaminar current collectors (formed of the second and first current collectors 131,113) between each anode 127 and cathode 123 in adjacent half cells, Stacking the unit cells 121 in series provide higher voltages in the bipolar batteries 129. Varying numbers of stacked unit cells 121 may provide a modular battery system to advantageously meet changing needs. A layer of a unit cell 121 comprising the array of segments 111 may be stored in a roll and dispensed, cut, and stacked as needed.

In another embodiment, the unit cells 121 may be stacked with an insulator between the first current collectors 113 and the second current collectors 131 creating a monopolar alternative to the bipolar arrangement. In this stack, a parallel connection of the first current collectors 113 and a parallel connection of the second current collectors 131 provides for higher cell capacity in the battery.

Figure 4:
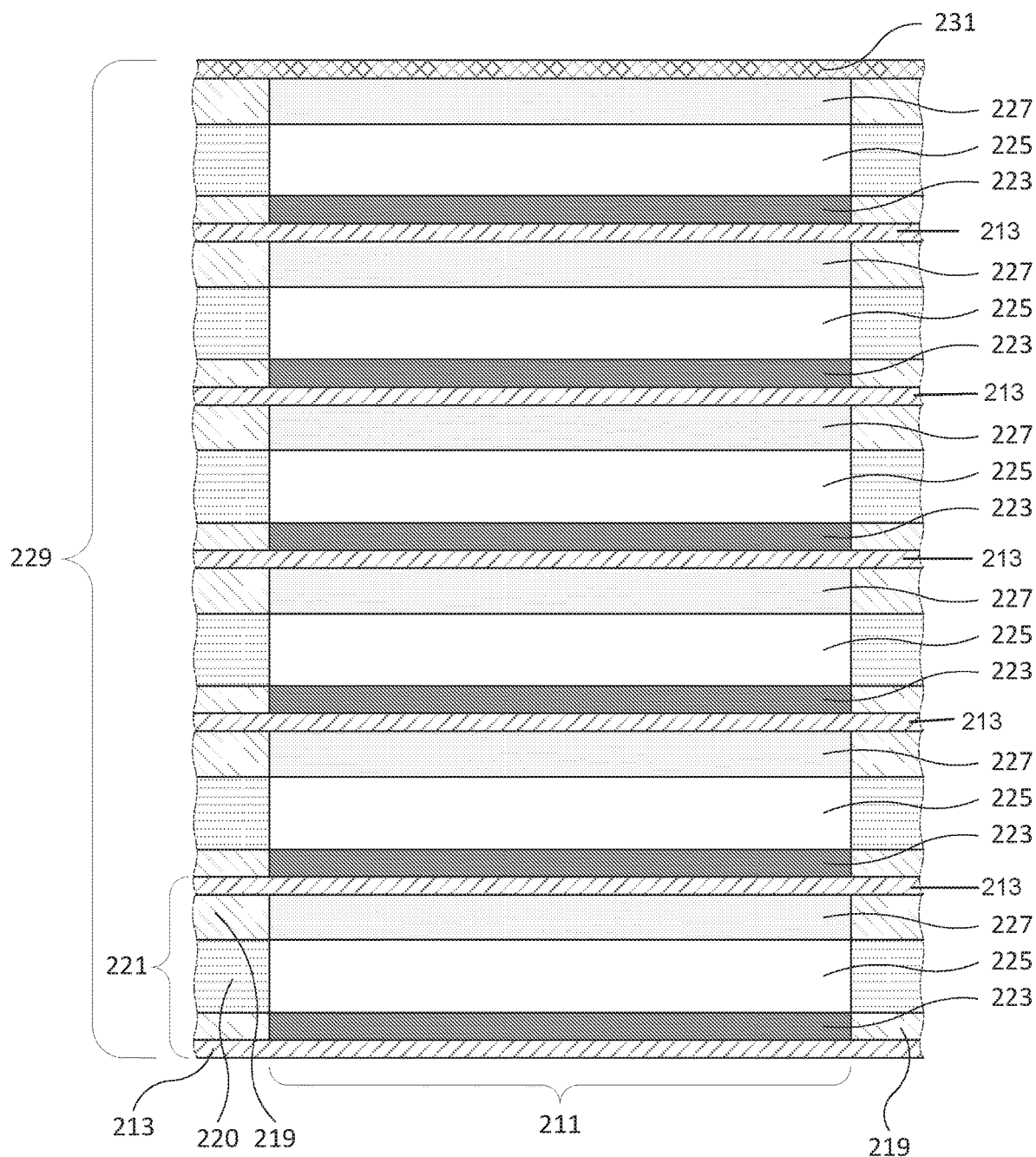
FIG. 4 is a partial side view of another exemplary embodiment of a bipolar stacked battery including segments embedded in structural matrices.

FIG. 4 shows a bipolar stack 229 of unit cells 221 similar to that of FIG. 3. The layers of current collector 213 and segments 211 of anode 223 surrounded by a structural matrix 219 together may form an electrode similar to the embodiments seen in FIGS. 1-2. The layer of an array (not shown) of segments 211 of solid-state electrolyte 225 surrounded by an electrolyte structural matrix 220 may be formed separately from this electrode. Further, an array of cathode 227 material spaced apart into segments 211 may be formed separately and surrounded by a structural matrix 219. These layers may be stacked to form a unit cell 221. These unit cells 221 may be further stacked or rolled or otherwise arranged to form an electrochemical device 229. Within the bipolar stack 229 shown in FIG. 4, the current collector 213 of the electrode, next to the anode 223, may act as a conductor for the cathode 227 of the adjacent unit cell 221. A final current collector 231 may be placed atop or otherwise connected to the stack of unit cells 221 to form a bipolar battery.

FIG. 5 shows an exploded view of how unit cells 221 comprising arrays of segments 211 (similar to those shown in FIG. 4) may be stacked and topped with current collector 231 to form a bipolar battery 229. FIG. 6 shows a stack of two unit cell 221 arrays with a quarter of the top layer shown in dashed lines to illustrate one possible arrangement of the segments 211 of each unit cell 221 directly on top of one another. Alternatively, the unit cells 221 may be arranged so that the segments 211 of adjacent unit cells 221 are offset from each other. Particular arrangements of the segments 211 within the stacks 229 may aid in structural stability of the stack 229 or even the flexibility of the same. For visual clarity, FIGS. 5-6 are shown without the structural matrix 219, but the segments 211 may be embedded in a structural matrix material at each unit cell 221 layer in the bipolar battery stack 229.

Figure 7:
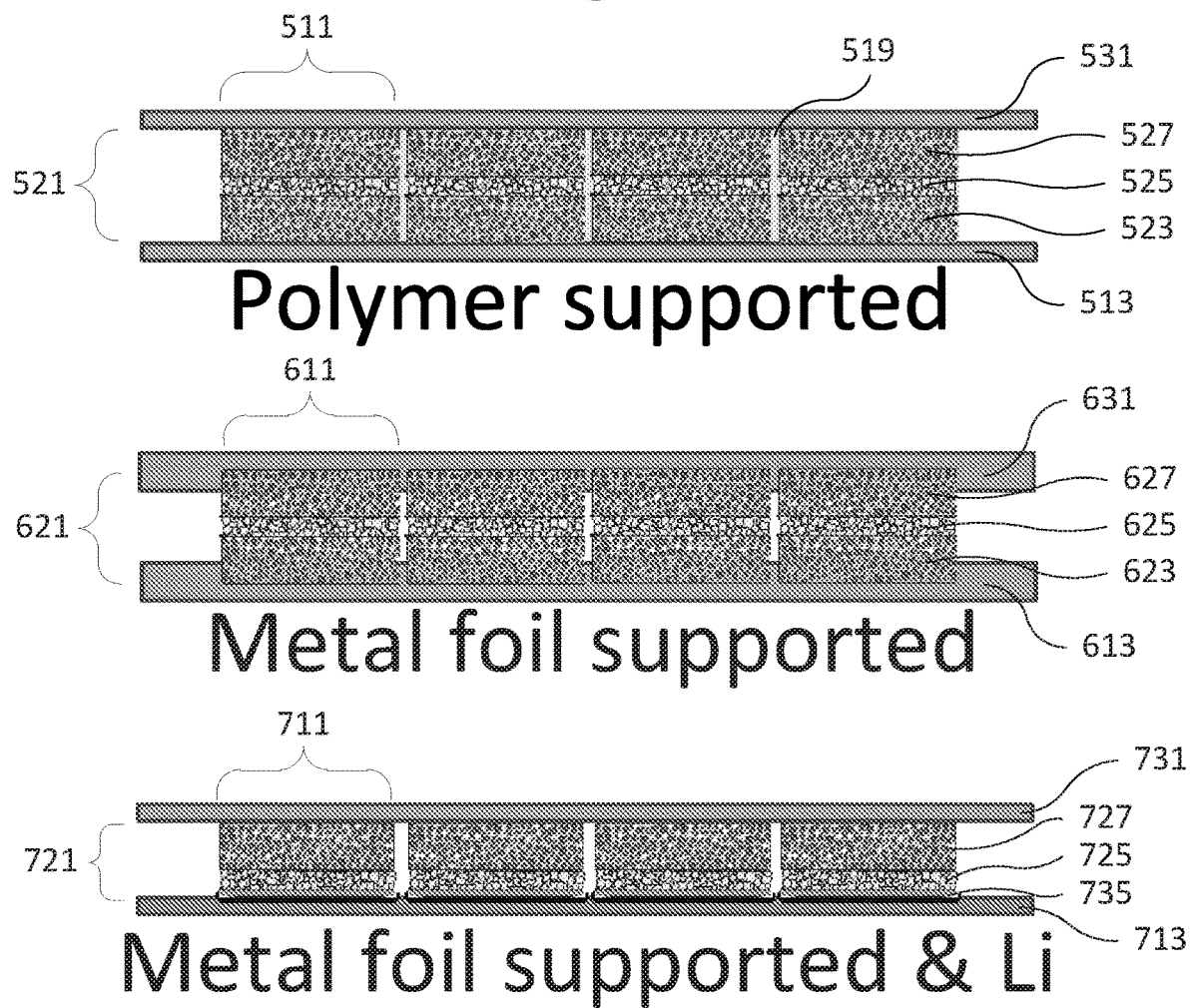
FIG. 7 is a side view of various example unit cell configurations.

As seen in FIG. 7, a unit cell 521 may be formed from layers of polymer composite anode 523, solid electrolyte 525, and polymer composite cathode 527. Either or both of the current collectors 513,531 may be applied to the top and/or bottom of the unit cell 521. The layers of polymer composite anode 523, solid electrolyte 525, and polymer composite cathode 527 may be arranged in an array of segments 511 within a structural matrix 519, which may comprise a polymer material. The structural matrix 519 may provide support for the segments 511 with the current collectors 513,531 applied separately. The polymer composite anode 523 may comprise anode active material mixed with a polymer. Likewise, the polymer composite cathode 527 may comprise cathode active material mixed with a polymer. The solid electrolyte 525 may comprise lithium lanthanum zirconium oxide or any other solid electrolyte material.

As also seen in FIG. 7, a unit cell 621 may be formed from layers of current collector 613, ceramic composite anode 623, solid electrolyte 625, ceramic composite cathode 627, and current collector 631. The layers of ceramic composite anode 623, solid electrolyte 625, and ceramic composite cathode 627 may be arranged in an array of segments 611. The segments 611 may be supported in the array by either or both of the current collectors 613,631 such that there is no need for a structural matrix between the segments 611 and those gaps may be filled with air or another substance. Alternatively, both a structural matrix and either or both of the current collectors 613,631 may help support the segments 611 in their array. As in the unit cell 521, the solid electrolyte 625 may comprise any solid electrolyte material, such as lithium lanthanum zirconium oxide, for example. The ceramic composite anode 623 may comprise anode active material mixed with a ceramic to form a composite. Likewise, the ceramic composite cathode 627 may comprise cathode active material mixed with a ceramic to form a composite.

As also shown in FIG. 7, a unit cell 721 may be formed from layers of current collector 713, lithium metal anode 735, solid electrolyte 725, ceramic composite cathode 727, and current collector 731. As shown, the segments 711 are supported by the current collector 713, which may be metal foil, but as described above a structural matrix may also support the segments 711 in an array. Lithium metal may replace either of the electrodes in a unit cell. Here, FIG. 7 shows the anode comprising, lithium metal 735.

Figure 8:
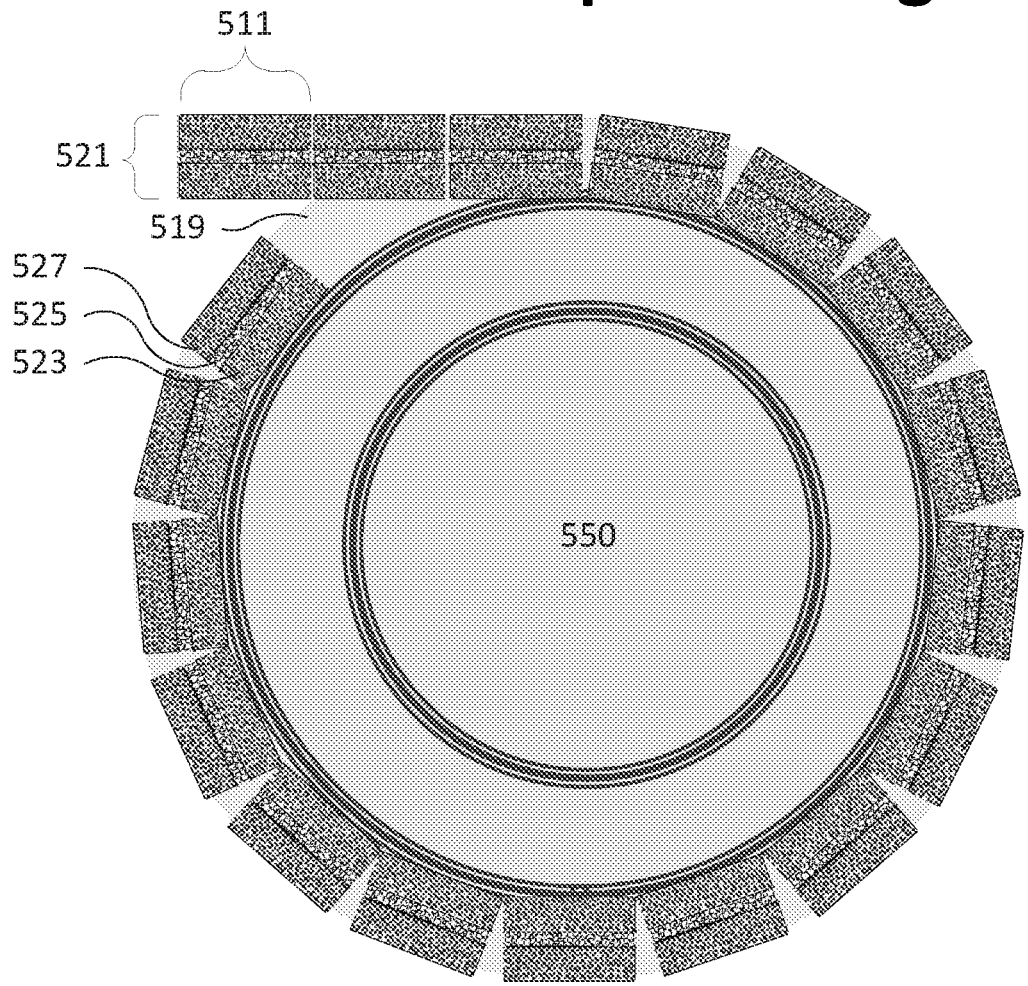
FIG. 8 is a partial side view of an example unit cell dispensing system.

FIG. 8 shows an example rolled dispensing system for sheets of a unit cell 521 similar to that shown in FIG. 7. The sheets of the unit cell 521 may comprise an array of segments 511 supported by a structural matrix 519. The sheets may be rolled around a cylindrical dispenser or drum 550 for easy accessibility. The length and width of a particular cell stack may be cut from the sheet after it is drawn from the drum 550. Additionally, the drum 550 may be arranged with other drums supplying sheets of other unit cells and/or current collectors such as metal foils. This arrangement could supply a system for continuous roll manufacturing of batteries. This may be advantageous for quickly manufacturing mass quantities of stacked, folded, or rolled batteries while utilizing electrodeposition sprays of components or other techniques amenable to continuous roll or sheet manufacturing. The rolled unit cells 521 arranged around a drum 550 may also be advantageous for custom battery sizes where the length and width may be cut or folded from the larger array of segments 511 in the sheet.

Figure 9:
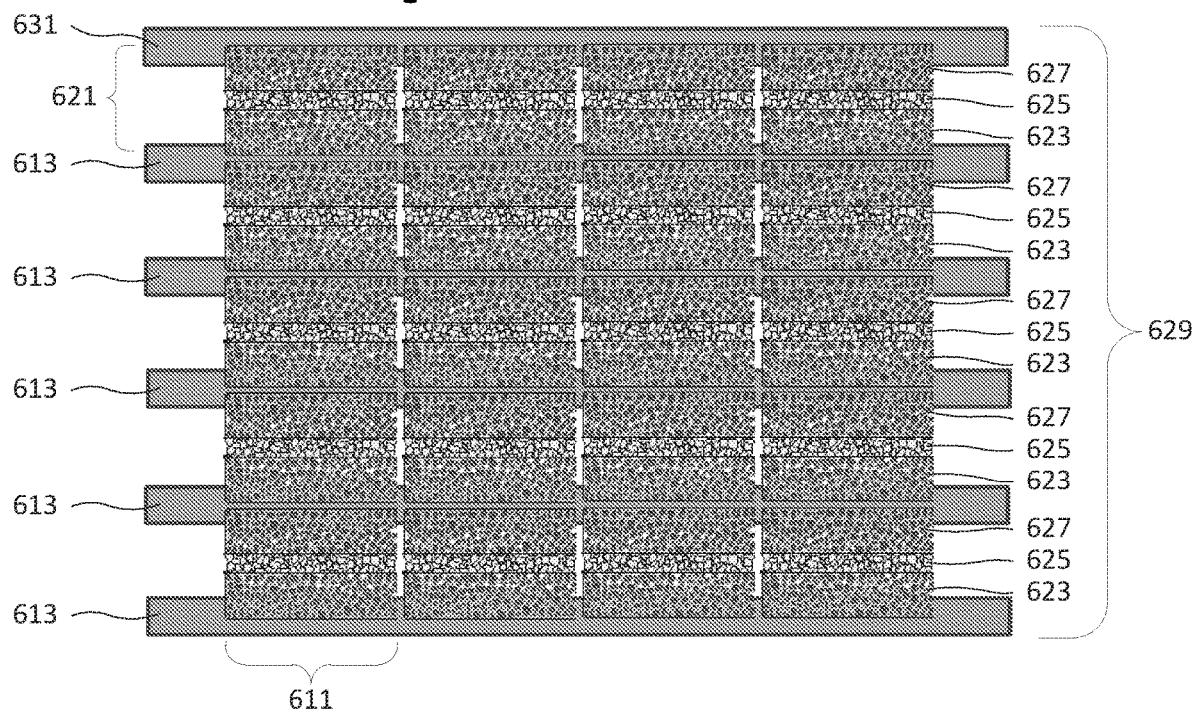
FIG. 9 is a side view of an example bipolar stacked battery made from unit cells similar to that shown in FIG. 7.

As seen in FIG. 9, a bipolar stacked battery 629 may be formed from layers of unit cells similar to that shown in FIG. 7. Here, the current collector 613 provides support for the segments 611 in their array. The current collector 613 may act as the conductor for both the anode of one unit cell 621 and the cathode of an adjacent unit cell. The current collector 631 may top off the battery stack and provide a good conductor for one terminal of the bipolar stacked battery 629.

Figure 10:
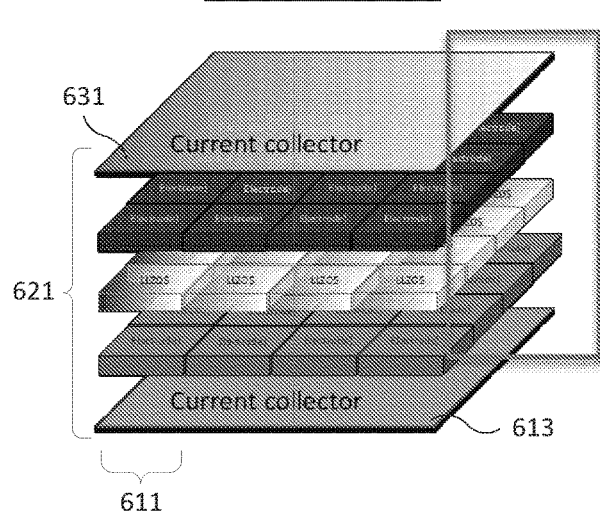
FIG. 10 is an exploded view of an example unit cell similar to that shown in FIG. 7.
Figure 11:
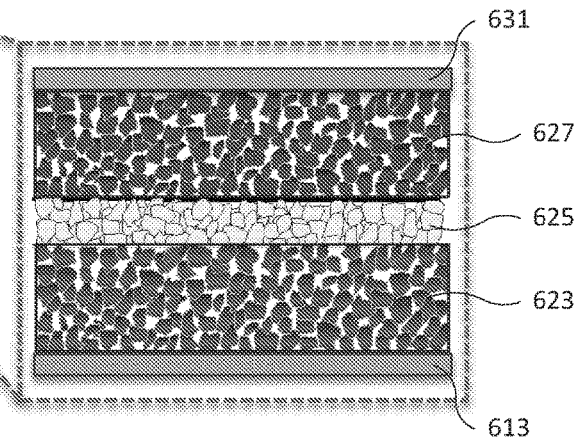
FIG. 11 is a partial detailed view of the example unit cell shown in FIG. 10.
Figure 12:
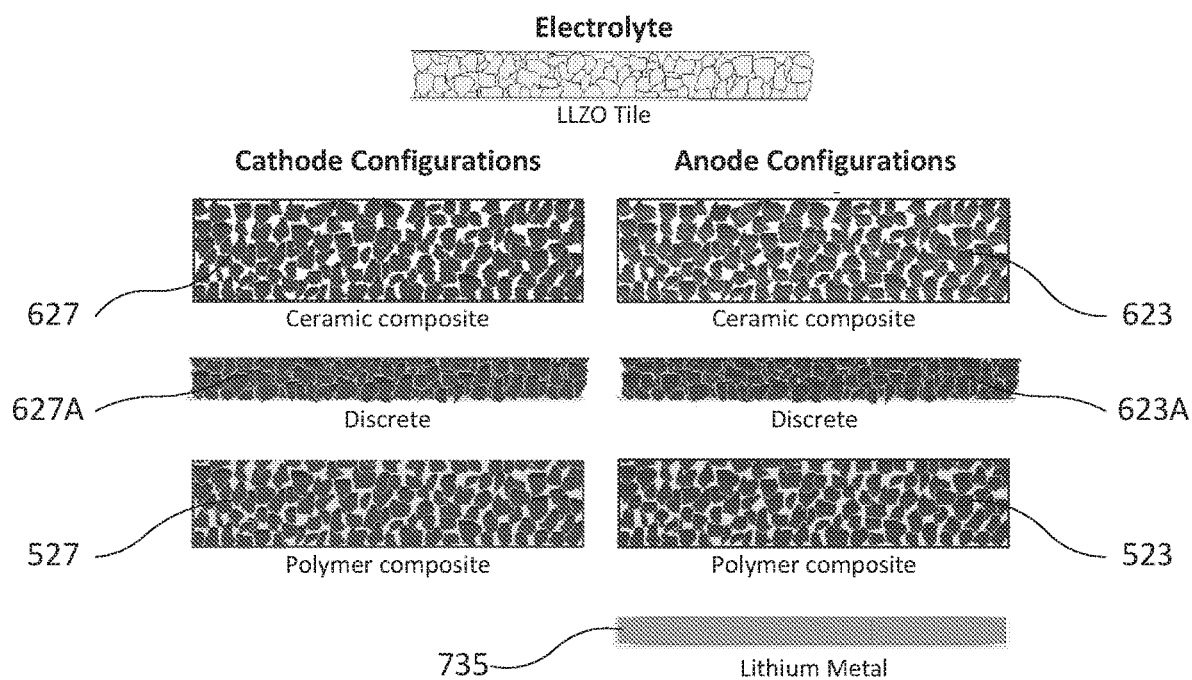
FIG. 12 is a partial side view of various example materials which may be used in a unit cell.

As seen in FIGS. 10-11, a unit cell 621 similar to one embodiment shown in FIG. 7 may be formed from stacking segments 611 of an electrolyte layer 625 between electrode layers in an array. The unit cell array 621 may be placed between current collectors 613,631. The electrode layers may comprise a layer of ceramic composite anode material 623 and a layer of ceramic composite cathode material 627. Alternatively, the electrode layers may comprise any suitable anode or cathode material such as those seen in FIG. 12, for example, discrete cathode material 627A, polymer composite cathode material 527, discrete anode material 623A, polymer composite anode material 523, and lithium metal 735.

Methods for forming electrodes or solid state electrolytes of the invention may include the steps of: (a) forming an array comprising spaced apart segments; and (b) depositing a flexible material between the segments. In one non-limiting example version of the method, the array comprising spaced apart segments may be formed by casting a slurry on a surface to form the array comprising spaced apart segments, and sintering the segments. Non-limiting example slurry formulations for forming the segments may include; (i) one or more active battery materials (e.g., lithium lanthanum zirconium oxide as a component of a solid electrolyte, or lithium host materials for the anode or cathode of a lithium ion battery); (ii) one or more binders; (iii) one or more dispersants (used to prevent suspended powders such as the active battery materials from settling); (iv) one or more plasticizers (for increasing the workability of the cast segments); (v) one or more sintering aids (i.e., a material added to the system that melts before other components in liquid phase sintering to cause grains to rearrange into a more favorable packing arrangement and provide attraction between the grains through capillary action; and (vi) one or more solvents. The slurry components are mixed and a layer is cast which is then sintered forming a ceramic layer suitable for use in a solid state battery.

The slurry formulation used in forming the segments can be tailored for solid state batteries by addressing the problem of lithium volatility in the slurry during sintering, A change in the material formulation from the loss of lithium can lead to negative consequences for battery performance (especially when using LLZO as the electrolyte). In one version of the method of the invention, excess lithium is added to the system to account for lithium loss, Lithium boron oxide may be used as the sintering aid; however, instead of directly adding lithium boron oxide, a precursor (e.g., a source of borate ions such as a boron containing alkoxide including tri-isopropyl borate) can be added and the precursor forms lithium boron oxide from the excess lithium.

When forming a solid electrolyte or an anode or a cathode, the slurry components are mixed until uniform and then a continuous layer or layer of segments is cast. The thickness of the cast layer can be controlled, and layers 10-150 microns in thickness are suitable for a solid electrolyte or an anode or a cathode of a solid state battery. Subsequent layers can be cast on top of one another. For example, the anode can be cast first, followed by the electrolyte, and finally the cathode. Alternatively, the cathode can be cast first, followed by the electrolyte, and finally the anode. These cast layers can be processed individually or as a unit such, that a solid-state battery is formed.

Slurry formulations used in forming the segments 11 can be utilized in a low temperature co-fired ceramics process. Additional constraints, not present in related fields, must be considered with electrochemical applications such as a solid state battery. Primarily, many solid state battery materials contain a large fraction of the element lithium, which is volatile at the high temperatures required for sintering. The loss of lithium, and thus change in the battery material formulation, will have negative consequences for the performance of the battery. This is especially true for solid electrolytes such as LLZO. Thus, any means of achieving a dense layer (i.e., sintering) at a lower temperature will help to alleviate the lithium loss problem. The slurry formulation described herein has been tailored to, among other things, specifically address lithium loss during sintering.

Each component of example slurry formulations used in forming the segments 11 (i.e., active battery material, sintering aid, dispersant, plasticizer, binder, and solvent) is discussed below.

Active Battery Materials—Depending on whether the slurry formulation is being used fabricate a solid electrolyte or an anode or a cathode, the active battery materials may be: (i) a component of a solid electrolyte, or (ii) lithium host materials for the anode or cathode of a lithium ion battery. The active battery materials may be particles. The suitable particles may have an average diameter of 1 nanometer to 500 micrometers. The particles may have any suitable shapes, including spherical. In another embodiment, the suitable particles may have more than one shape. The active battery materials may be fibers.

A suitable solid electrolyte active material is Li-ion fast conducting materials. The solid electrolyte can be any combination oxide or phosphate materials with the garnet, perovskite, NaSICON, or LiSICON phase. The garnet phase can have the formula $Li_uRe_vM_wA_xO_y$, wherein Re can be any combination of elements with a nominal valance of +3 including La, Nd, Pr, Pm, Sm, Sc, Eu, Gd, Tb, Dy, Y, Ho, Er, Tm, Yb, and Lu; M can be any combination of metals with a nominal valance of +3, +4, +5 or +6 including Zr, Ta, Nb, Sb, W, Hf, Sn, Ti, V, Bi, Ge, and Si; A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn; u can vary from 3-7.5; v can vary from 0-3; w can vary from 0-2; and y can vary from 11-12.5. The garnet can be lithium lanthanum zirconium oxide having the formula $Li_{6.25}La_3Zr_2Al_{0.25}O_{12}$ (LLZO). Disadvantages associated with the degradation of liquid electrolytes can be eliminated if a solid electrolyte is used. To match or exceed the current ionic conductivity values of a liquid electrolyte, solid electrolytes need to be near theoretical density and be thermally and chemically stable in air and against metallic lithium. The formation of lithium dendrites in the solid electrolyte after charging cycles should be minimized or eliminated. High-density solid electrolytes can be produced through optimization of the slurry sintering conditions, i.e., time, temperature, pressure, atmosphere and chemical composition. Ceramic powder processing optimization of the sintering temperature and sintering mechanism has been shown here to increase the density as well as the Li-ion conductivity in the garnet lithium lanthanum zirconium oxide electrolyte $Li_{6.25}La_3Zr_2Al_{0.25}O_{12}$ (LLZO).

A suitable cathode active material is a lithium host material capable of storing and subsequently releasing lithium ions. An example cathode active material is a lithium metal oxide wherein the metal is one or more aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, $LiNi_xCo_yAl_zO_2$, $LiNi_{1/3}Mn_{1/3}Co_{1/3}O_2$ and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on dilithiation and cycling performance of the cathode materials. The cathode active material can be a mixture of any number of these cathode active materials.

A suitable anode active material is a lithium host material capable of incorporating and subsequently releasing the lithium ion such as graphite, lithium metal, lithium titanium oxide, hard carbon, a tin/cobalt alloy, or silicon/carbon. The anode active material can be a mixture of any number of these anode active materials.

Sintering Aid—Optional sintering aids which melt and form a liquid can assist in sintering, of a cast slurry formulation used in forming the segments 11 via liquid phase sintering. In one version of the slurry formulation of the invention, the sintering aid provides a source of borate ions. In another version of the slurry formulation, the sintering aid provides a source of phosphate ions. In another version of the slurry formulation, the sintering aid provides a source of silicate ions. In another version of the slurry formulation, the sintering aid provides a source of aluminate ions. Example sintering aids can be selected from boric acid, boric acid salts, boric acid esters, boron alkoxides phosphoric acid, phosphoric acid salts, phosphate acid esters, silicic acid, silicic acid salts, silanols, silicon alkoxides, aluminum alkoxides and mixtures thereof that assist in the formation of lithium boron oxide (LBO), lithium phosphate, lithium silicate, and lithium aluminum oxide phases. For example, excess lithium reacts with the sintering aid to form a lithium borate phase in-situ between the LLZO grains during heating. In the method described herein, a liquid source of the sintering aid (e.g., tri-isopropyl borate as a source of borate ions) can be included in the slurry formulation. Since the source of borate ions is a liquid, it uniformly and conformally coats the active battery materials in the slurry thereby forming interphase layers upon sintering. In the case of LLZO, excess lithium is added to the system to account for the lithium loss that occurs during high temperature processing. The excess lithium acts as a source to form the LBO phase from the source of borate ions (e.g., tri-isopropyl borate). An LLZO having an excess of lithium ions can provide the lithium ions needed to react with the source of borate ions to form the LBO phase.

Dispersant—The slurry formulation may optionally include a dispersant. One purpose of the dispersant is to stabilize the slurry and prevent the suspended active battery material particles from settling out. The dispersant can also provide a source of lithium ions that is needed to react with the sintering aid. In the slurry formulation, the dispersant chosen may contain lithium ions and is soluble in the solvent. This means that the dispersant can stabilize the particles in the slurry during casting and also act as a source of lithium ions when the temperature is increased after the cast segments are dried. The dispersant may be selected from the group consisting of salts of lithium and a fatty acid. The fatty acid may be selected from lauric acid, myristic acid, palmitic acid, stearic acid, oleic acid, linoleic acid, linolenic acid, arachidic acid, and behenic acid. In one non-limiting example of the slurry formulation, the dispersant is lithium stearate.

Plasticizer—The slurry formulation may optionally include a plasticizer. The purpose of the plasticizer is to increase the workability of the as-cast segments. Preferably, the plasticizer is a naturally derived plant based oil. The plasticizer may be selected from the group consisting of coconut oil, castor oil, soybean oil, palm kernel oil, almond oil, corn oil, canola oil, rapeseed oil, and mixtures thereof. Although a petroleum derivative could also be used for the plasticizer, the choice of a plant oil is sustainable. The plasticizer was also chosen to reduce the evaporation rate of the solvent and increase the mechanical ductility of the slurry after drying. In one non-limiting example of the slurry formulation, coconut oil is used for the plasticizer.

Binder—The slurry formulation may optionally include a binder. Non-limiting examples of the binder include: poly (methylmethacrylate), poly(vinylacetate), polyvinyl alcohol, polyethyleneoxide, polyvinylpyrrolidone, polyvinyl ether, polyvinylchloride, polyacrylonitrile, polyvinylpyridine, styrene-butadiene rubber, acrylonitrile-butadiene rubber, polyethylene, polypropylene, ethylene-propylene-diene terpolymers (EPDM), cellulose, carboxymethylcellulose, starch, hydroxypropylcellulose, and mixtures thereof. The binder is preferably a non-fluorinated polymeric material. Fluorinated polymers, such as polytetrafluoroethylene) (Teflon®) and polyvinylidene fluoride, are often used as binders in current Li-ion batteries. However, unlike current Li-ion batteries, the cast ceramic segment layers of the present invention will be sintered. The elevated temperatures and the presence of fluorine in the polymers results in the unavoidable formation of the compound LiF and deterioration of the performance of the battery. In one non-limiting example slurry formulation, an acrylic polymer, poly(methylmethacrylate), can be chosen since these polymers leave behind little to no residue when heated.

Solvent—A solvent is useful in a slurry formulation to dissolve the binder and act as a medium for mixing the other additives. Any suitable solvents may be used for mixing the active battery material particles, dispersant, and binder into a uniform slurry. Suitable solvents may include alkanols (e.g., ethanol), nitriles (e.g., acetonitrile), alkyl carbonates, alkylene carbonates (e.g., propylene carbonate), alkyl acetates, sulfoxides, glycol ethers, ethers, N-methyl-2-pyrrolidone, dimethylformamide, dimethylacetamide, tetrahydrofuran, or a mixture of any of these solvents. For one non-limiting example slurry formulation, a mixture of two solvents can be chosen. First, a solvent can be chosen to dissolve the binder and the dispersant. A second solvent can be added and the ratio of plasticizer varied to tune the evaporation rate and resulting cast slurry segments. In one non-limiting example slurry formulation, a mixture of ethanol and acetonitrile can be used for the solvent.

Other Additives—The slurry formulation may include other additives. For example, the cathode or anode active battery material particles may be mixed with other particles, such as conductive particles. Any conductive material may be used without particular limitation so long as it has suitable conductivity without causing chemical changes in the fabricated battery, Examples of conductive materials include graphite; carbon blacks such as carbon black, acetylene black, Ketjen channel black, furnace black, lamp black and thermal black; conductive fibers such as carbon fibers and metallic fibers; metallic powders such as aluminum powder and nickel powder; conductive whiskers such as zinc oxide and potassium titanate; conductive metal oxides such as titanium oxide; and polyphenylene derivatives.

Any suitable method may be used to mix the active battery material particles and/or other particles with the sintering aid, plasticizer, binder and solvent into a uniform slurry. Suitable mixing methods may include sonication, mechanical stirring, physical shaking, vortexing, ball milling, and any other suitable means.

After the uniform slurry is obtained, the formulation is cast on a substrate surface to form a cast layer or a cast layer of segments. The substrate may include any stable and conductive metals suitable as a current collector for the battery. A suitable metallic substrate may include aluminum, copper, silver, iron, gold, nickel, cobalt, titanium, molybdenum, steel, zirconium, tantalum, and stainless steel. In one embodiment, the metal substrate is aluminum.

The slurry layer cast on the surface may have a thickness in the range of a few micrometers to a few centimeters. In one embodiment, the thickness of the cast slurry layer is in the range of 10 micrometers to 150 micrometers, preferably 10 micrometers to 100 micrometers, more preferably 10 micrometers to 50 micrometers.

After the slurry is cast on the substrate surface to form a cast layer or a cast layer of segments, the green layer or green layer of segments can be dried and sintered at a temperature in a range of 300° C. to 1200° C., more preferably 600° C. to 1000° C. to achieve the necessary electrochemical properties. Optionally, multiple layers can be cast on top of one another. For example, the anode can be cast first on the metal substrate, followed by casting the electrolyte on the anode, and finally casting the cathode on the electrolyte. Alternatively, the cathode can be cast first on the metal substrate, followed by the electrolyte, and finally the anode. The multi-layer green cast layer or green cast layer of segments can be dried and sintered at a temperature in a range of 300° C. to 1200° C., more preferably 600° C. to 1000° C. to achieve the necessary electrochemical properties.

Tables 1, 2 and 3 below provide general formulas for slurries for casting a cast a layer or a layer of segments according to the present invention.

TABLE 1

Slurry for Casting Solid State Electrolyte Layer Or Layer Of Segments

| Component Functional Description | Weight Percentage |
|---|---|
| Lithium Ion Conductor | 35-65 wt % |
| Binder | 1-5 wt % |
| Dispersant - Source of Lithium Ions | 0.1-5 wt % |
| Plasticizer | 1-30 wt % |
| Sintering Aid - Source of Borate Ions | 0-5 wt % |
| Solvent | 10-55 wt % |

All weight percentages are percent by weight of the total slurry.

TABLE 2

Slurry for Casting Cathode Layer Or Layer Of Segments

| Component Functional Description | Weight Percentage |
|---|---|
| Lithium Host Material | 35-65 wt % |
| Binder | 1-5 wt % |
| Dispersant - Source of Lithium Ions | 0.1-5 wt % |
| Plasticizer | 1-30 wt % |
| Sintering Aid - Source of Borate Ions | 0-5 wt % |
| Solvent | 10-55 wt % |

All weight percentages are percent by weight of the total slurry.

TABLE 3

Slurry for Casting Anode Layer Or Layer Of Segments

| Component Functional Description | Weight Percentage |
|---|---|
| Lithium Host Material | 35-65 wt % |
| Binder | 1-5 wt % |
| Dispersant - Source of Lithium Ions | 0.1-5 wt % |
| Plasticizer | 1-30 wt % |

TABLE 3-continued

Slurry for Casting Anode Layer Or Layer Of Segments

| Component Functional Description | Weight Percentage |
|---|---|
| Sintering Aid - Source of Borate Ions | 0-5 wt % |
| Solvent | 10-55 wt % |

All weight percentages are percent by weight of the total slurry.

Thus, the present invention provides methods and structures for the fabrication of solid-state batteries, such as lithium ion solid state batteries, into segmented cell architectures.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. An electrochemical device comprising:
   a first layer comprising a cathode comprising a first array of first segments embedded within a first structural matrix;
   a second layer comprising an anode comprising a second array of second segments embedded within a second structural matrix; and
   a third layer comprising a solid-state electrolyte comprising a third array of third segments embedded within a third structural matrix,
   wherein each of the first structural matrix, the second structural matrix, and the third structural matrix comprises a flexible polymeric material,
   wherein the first layer, the second layer, and the third layer are stacked and bonded together to form a unit cell with the third layer positioned between the first layer and the second layer,
   wherein at least one of the first segments of the cathode and the second segments of the anode contact a current collector,
   wherein the distance across the first segments, the second segments, and the third segments is in a range of 1 micrometer to 5 centimeters,
   wherein the thickness of the first segments, the second segments, and the third segments is in a range of 1 micrometer to 100 micrometers, and
   wherein the first segments, the second segments, and the third segments have a ratio of a distance across the segment to a thickness of the segment in a range of 1:1 to 50,000:1.

2. The electrochemical device of claim 1, wherein the third array of third segments comprises a solid electrolyte material selected from the group consisting of oxide materials with the garnet phase.

3. The electrochemical device of claim 1, wherein:
   the second array of second segments comprises a lithium host material selected from the group consisting of graphite, lithium metal, lithium titanium oxides, hard carbon, tin/cobalt alloy, or silicon/carbon.

4. The electrochemical device of claim 1, wherein:
   the distance across the segments is in a range of 1 centimeter to 5 centimeters.

5. The electrochemical device of claim 4, wherein:
   the thickness of the segments in a range of 1 micrometer to 100 micrometers.

6. The electrochemical device of claim 5, wherein:
the segments are spaced from 100 nanometers to 50 micrometers away from each other.

7. The electrochemical device of claim 1, wherein:
the device is capable of assuming a folded stack structure.

8. The electrochemical device of claim 1, wherein:
the first segments of the cathode contact the current collector, and
the second segments of the anode contact a second current collector.

9. The electrochemical device of claim 8, further comprising:
a fourth layer comprising a second cathode comprising a fourth array of fourth segments embedded within a fourth structural matrix;
a fifth layer comprising a second anode comprising a fifth array of fifth segments embedded within a fifth structural matrix; and
a sixth layer comprising a second solid-state electrolyte comprising a sixth array of sixth segments embedded within a sixth structural matrix,
wherein the fourth layer, the fifth layer, and the sixth layer are stacked and bonded together to form a second unit cell with the sixth layer positioned between the fourth layer and the fifth layer,
wherein the fourth segments of the second cathode contact the second current collector, and
wherein the fifth segments of the second anode contact a third current collector.

10. The electrochemical device of claim 1, wherein:
the first segments of the cathode, the second segments of the anode, and the third segments of the solid-state electrolyte are aligned in the unit cell.

11. An electrochemical device comprising:
a first layer comprising a cathode comprising a first array of first segments embedded within a first structural matrix;
a second layer comprising an anode comprising a second array of second segments embedded within a second structural matrix; and
a third layer comprising a solid-state electrolyte comprising a third array of third segments embedded within a third structural matrix,
wherein the first layer, the second layer, and the third layer are stacked and bonded together to form a unit cell with the third layer positioned between the first layer and the second layer,
wherein at least one of the first segments of the cathode and the second segments of the anode contact a current collector,
wherein the distance across the first segments, the second segments, and the third segments is in a range of 1 micrometer to 5 centimeters,
wherein the thickness of the first segments, the second segments, and the third segments is in a range of 1 micrometer to 100 micrometers,
wherein the first segments, the second segments, and the third segments have a ratio of a distance across the segment to a thickness of the segment in a range of 1:1 to 50,000:1, and
wherein the first array of first segments comprises a lithium host material selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel.

12. An electrochemical device comprising:
a first layer comprising a cathode comprising a first array of first segments embedded within a first structural matrix;
a second layer comprising an anode comprising a second array of second segments embedded within a second structural matrix; and
a third layer comprising a solid-state electrolyte comprising a third array of third segments embedded within a third structural matrix,
wherein the first layer, the second layer, and the third layer are stacked and bonded together to form a unit cell with the third layer positioned between the first layer and the second layer,
wherein at least one of the first segments of the cathode and the second segments of the anode contact a current collector,
wherein the distance across the first segments, the second segments, and the third segments is in a range of 1 micrometer to 5 centimeters,
wherein the thickness of the first segments, the second segments, and the third segments is in a range of 1 micrometer to 100 micrometers,
wherein the first segments, the second segments, and the third segments have a ratio of a distance across the segment to a thickness of the segment in a range of 1:1 to 50,000:1, and
wherein the third array of third segments comprises a solid electrolyte material selected from the group consisting of oxide materials with the garnet phase.

13. The electrochemical device of claim 12, wherein the solid electrolyte material is a lithium lanthanum zirconium oxide.

14. A method for forming an electrochemical device, the method comprising:
(a) forming a first layer comprising a cathode comprising a first array of first segments embedded within a first structural matrix;
(b) forming a second layer comprising an anode comprising a second array of second segments embedded within a second structural matrix;
(c) forming a third layer comprising a solid-state electrolyte comprising a third array of third segments embedded within a third structural matrix, wherein each of the first structural matrix, the second structural matrix, and the third structural matrix comprises a flexible polymeric material; and
(d) stacking and bonding together the first layer, the second layer, and the third layer to form a unit cell with the third layer positioned between the first layer and the second layer; wherein the distance across the first segments, the second segments, and the third segments is in a range of 1 micrometer to 5 centimeters, wherein the thickness of the first segments, the second segments, and the third segments is in a range of 1 micrometer to 100 micrometers, and wherein the first segments, the second segments, and the third segments have a ratio of a distance across the segment to a thickness of the segment in a range of 1:1 to 50,000:1.

15. The method of claim 14, wherein the third array of third segments comprises a solid electrolyte material selected from the group consisting of oxide materials with the garnet phase.

16. The method of claim 14, wherein the second array of second segments comprises a lithium host material selected from the group consisting of graphite, lithium metal, lithium titanium oxides, hard carbon, tin/cobalt alloy, or silicon/carbon.

17. The method of claim 14, further comprising:
(e) placing the first segments of the cathode in contact with a first current collector, and
(f) placing the second segments of the anode in contact with a second current collector.

18. The method of claim 14, further comprising:
(g) forming a fourth layer comprising a second cathode comprising a fourth array of fourth segments embedded within a fourth structural matrix;
(h) forming a fifth layer comprising a second anode comprising a fifth array of fifth segments embedded within a fifth structural matrix;
(i) forming a sixth layer comprising a second solid-state electrolyte comprising a sixth array of sixth segments embedded within a sixth structural matrix;
(j) stacking and bonding together the fourth layer, the fifth layer, and the sixth layer to form a second unit cell with the sixth layer positioned between the fourth layer and the fifth layer,
(k) placing the fourth segments of the second cathode in contact with the second current collector, and
(l) placing the fifth segments of the second anode in contact with a third current collector.

19. The method of claim 14, wherein the first segments of the cathode, the second segments of the anode, and the third segments of the solid-state electrolyte are aligned in the unit cell.

20. A method for forming an electrochemical device, the method comprising:
(a) forming a first layer comprising a cathode comprising a first array of first segments embedded within a first structural matrix;
(b) forming a second layer comprising an anode comprising a second array of second segments embedded within a second structural matrix;
(c) forming a third layer comprising a solid-state electrolyte comprising a third array of third segments embedded within a third structural matrix; and
(d) stacking and bonding together the first layer, the second layer, and the third layer to form a unit cell with the third layer positioned between the first layer and the second layer; wherein the distance across the first segments, the second segments, and the third segments is in a range of 1 micrometer to 5 centimeters, wherein the thickness of the first segments, the second segments, and the third segments is in a range of 1 micrometer to 100 micrometers, and wherein the first segments, the second segments, and the third segments have a ratio of a distance across the segment to a thickness of the segment in a range of 1:1 to 50,000:1,
wherein the first array of first segments comprises a lithium host material selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel.

21. A method for forming an electrochemical device, the method comprising:
(a) forming a first layer comprising a cathode comprising a first array of first segments embedded within a first structural matrix;
(b) forming a second layer comprising an anode comprising a second array of second segments embedded within a second structural matrix;
(c) forming a third layer comprising a solid-state electrolyte comprising a third array of third segments embedded within a third structural matrix; and
(d) stacking and bonding together the first layer, the second layer, and the third layer to form a unit cell with the third layer positioned between the first layer and the second layer; wherein the distance across the first segments, the second segments, and the third segments is in a range of 1 micrometer to 5 centimeters, wherein the thickness of the first segments, the second segments, and the third segments is in a range of 1 micrometer to 100 micrometers, and wherein the first segments, the second segments, and the third segments have a ratio of a distance across the segment to a thickness of the segment in a range of 1:1 to 50,000:1,
wherein the third array of third segments comprises a solid electrolyte material selected from the group consisting of oxide materials with the garnet phase.

22. The method of claim 21, wherein the solid electrolyte material is a lithium lanthanum zirconium oxide.

* * * * *

UNITED STATES PATENT AND TRADEMARK OFFICE
CERTIFICATE OF CORRECTION

PATENT NO. : 12,308,391 B2
APPLICATION NO. : 15/421499
DATED : May 20, 2025
INVENTOR(S) : Jeffrey Sakamoto et al.

Page 1 of 1

It is certified that error appears in the above-identified patent and that said Letters Patent is hereby corrected as shown below:

In the Specification

Column 1, Line 32, "lion" should be --ion--.

Column 13, Line 2, "dilithiation" should be --delithiation--.

Column 14, Line 52, "Ketjen channel" should be --Ketjen black, channel--.

Signed and Sealed this
Eighth Day of July, 2025

Coke Morgan Stewart
*Acting Director of the United States Patent and Trademark Office*